(No Model.)  2 Sheets—Sheet 1.
W. S. MAYERS.
WATER LEVEL INDICATOR.
No. 344,121. Patented June 22, 1886.
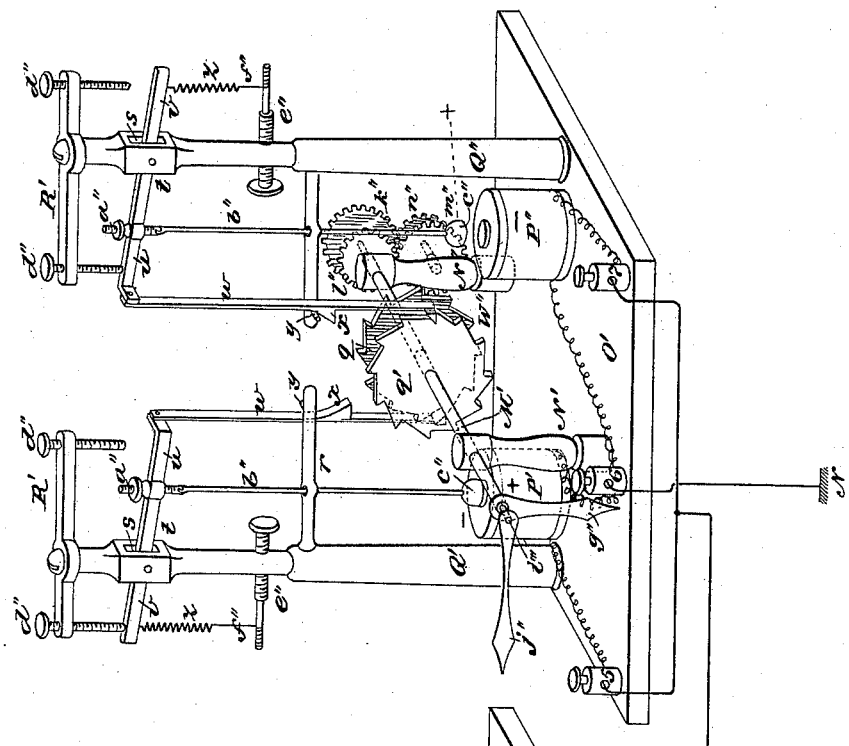
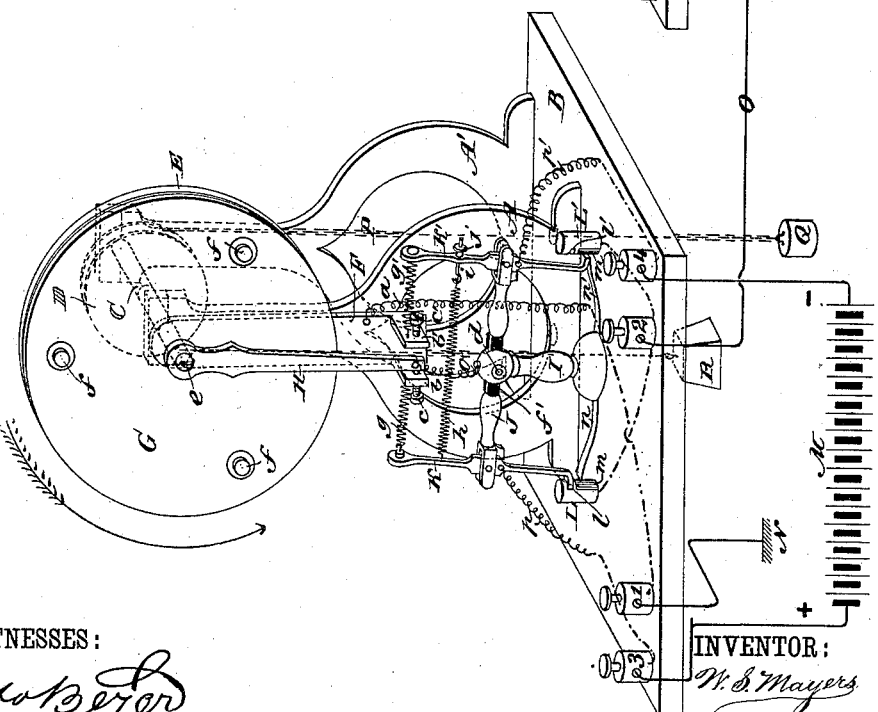
WITNESSES:
Otto Berger
C. Sedgwick
INVENTOR:
W. S. Mayers
BY Munn & Co.
ATTORNEYS.

(No Model.)

W. S. MAYERS.
WATER LEVEL INDICATOR.

No. 344,121. Patented June 22, 1886.

WITNESSES:
Otto Berger
C. Sedgwick

INVENTOR:
W. S. Mayers
BY Munn & Co.
ATTORNEYS.

UNITED STATES PATENT OFFICE.

WILBUR S. MAYERS, OF FORT APACHE, ARIZONA TERRITORY.

WATER-LEVEL INDICATOR.

SPECIFICATION forming part of Letters Patent No. 344,121, dated June 22, 1886.

Application filed December 28, 1885. Serial No. 186,879. (No model.)

*To all whom it may concern:*

Be it known that I, WILBUR S. MAYERS, of Fort Apache, in the county of Apache and Territory of Arizona, have invented a new and useful Improvement in Electrical Water-Level Indicators, of which the following is a specification, reference being had to the annexed drawings, forming a part thereof, in which—

Figure 3:
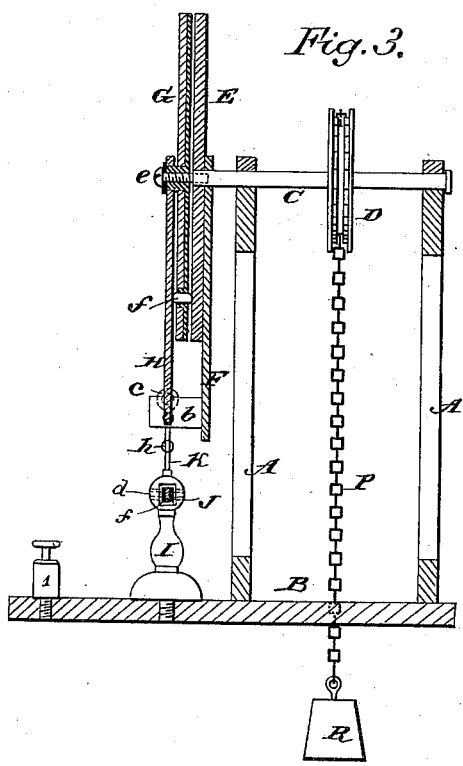
Figure 4:
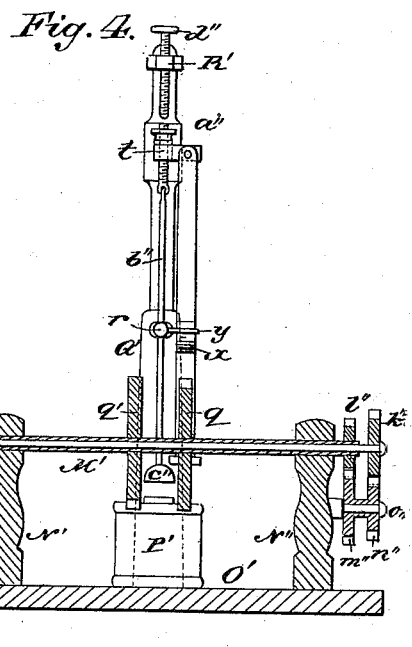
Figure 5:
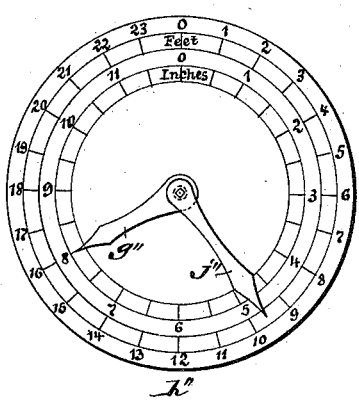

Figure 1 is a perspective view of the electro-mechanical transmitter. Fig. 2 is a perspective view of the electro-mechanical receiver with the dial removed. Fig. 3 is a vertical transverse section of the transmitter, taken through the center of the instrument in the direction of the axis of the shaft. Fig. 4 is a vertical transverse section of the receiving-instrument, taken on a line through the axis of the shaft. Fig. 5 is a detail view of the dial and indexes.

Similar letters of reference indicate corresponding parts in the different figures of the drawings.

My invention relates to the class of instruments employed for indicating the level of water at a distance; and it consists in electro-mechanical means for transmitting the electrical impulse of one kind when the water rises, and of another kind when the water falls, and in electro-mechanical devices capable of being acted on by the two kinds of impulses to operate registering mechanism to show the rise and fall in the level of the water.

In standards A A', secured to the base B, is journaled the shaft C, to which, between the standards, is fixed the chain-wheel D. Upon one end of the shaft C is secured a metal disk, E, and between the standards A A' and the disk E an arm, F, is placed on the shaft C, in electrical contact with the disk E, and in frictional contact with the disk and shaft C, so that while it may be moved by the shaft the friction between the arm and the shaft or disk will not prevent the shaft from turning. The arm F projects downward beyond the periphery of the disk E, and is connected by the wire $a$ with the binding-post 1. The arm F is provided with arms $b\ b'$, which extend from opposite edges of the arm outward below the disk E, and are provided with rubber-tipped screws $c\ c'$.

On a screw, $e$, projecting from the center of the shaft C, is placed a metal disk, G, which is separated from the disk E and screw $e$ by insulating material. A number of spring contact-points, $f$, project from the disk E through openings in the disk G, and extend a short distance beyond the surface of the disk, their number and distance apart depending upon their distance from the disk and radius of wheel D, there being one point for every inch of circumference of wheel D. An arm, H, placed on the screw $e$, but insulated therefrom, is held in electrical and frictional contact with the disk G, so that it may be moved by the rotation of the disk, but does not offer sufficient resistance, when held, to prevent the shaft C and the disk carried thereby from turning.

The arm H projects downward beyond the periphery of the disk G, between the rubber-tipped screws $c\ c'$, carried by the arms $b\ b'$. The contact-points $f$ project beyond the face of the disk G sufficiently to touch the arm H as they are carried around by the revolution of the disk E in one direction or the other.

To the base B, in front of the center of the standard A, is secured a standard, I, which is mortised transversely and receives the lever J, which is fulcrumed on a pin, $d$, passing through the post I. The central portion, $f'$, of the lever J is made of insulating material, and in the forked ends of the lever J are pivoted levers K K', having arms extending above and below the lever J. The path of levers K K' is limited on one side by the posts L L', and on the other by shoulders on the under side of lever J near the mortises. The outside ends of the spiral springs $g\ g'$ are connected to but insulated from the upper ends of levers K K'. The other ends are connected to the arms $b\ b'$. Between the extremities of the upper ends of the levers K K' and their pivots the said levers are connected by a spiral spring, $h$, which is permanently connected with the lever K by one of its ends and insulated, the opposite end being received in a tension-screw, $i$, passing through the lever K', and provided with an adjustable nut, $j$, by means of which the spring $h$ may be put under more or less tension.

The lower extremities of the levers K K' are bent outward at right angles, and to the base B are secured metallic posts L L', having in approximate faces the notches $l\ l'$, for receiving the angled ends of the levers K K', and below the notches on approximate faces the posts L L' are each provided with an insulating-covering, m. From the base of the post I flat curved springs n n' project toward the posts L L', and terminate below the notches l l'.

The arm H is connected by a wire, o, with the post I. The posts L L' are connected with the binding-post 2. The lever K is connected by a wire, p, with the binding-post 3, and the lever K' is connected by a wire, p', with the binding-post 4. The binding-posts 3 and 4 are connected with the terminals of the battery M. The binding-post 1 is connected with the ground N, and the binding-post 2 is connected with the line-wire O, which leads to the distant station. A chain, P, extending over the wheel D, carries at one end a float, Q, which is arranged in any suitable way to be acted upon by the water. At the free end of the chain there is a counterbalance-weight, R, which serves to keep the chain taut, and to act in connection with the float Q in turning the wheel C.

The receiving-instrument which is used in connection with the transmitter I have described is shown in Figs. 2, 4, and 5.

The hollow horizontal shaft M' is journaled in the posts N' N" above the middle of the base O', and to the shaft M', between the posts, are secured two ratchet-wheels, q q', with the teeth of one wheel oppositely arranged with respect to the teeth of the other wheel.

Polarized electro-magnets P' P" are secured to the base O' at opposite sides of the shaft M', and near the magnets P' P" are posts Q' Q", which support the mechanism actuated by the magnets, and as both sets of mechanism are alike, except in being oppositely disposed to enable them to act on the oppositely-arranged ratchet-wheels q q', one description will answer for both. From the post Q', near the middle thereof, an arm, r, projects over the ratchet-wheel q, and in a mortise, s, near the top of the post is pivoted a lever, t, having arms u v projecting in opposite directions from the post. The longer arm, u, of the lever is bent at right angles, and to it is secured a spring-pawl, w, having a beveled cam, x, which engages a pin, y, projecting from the side of the arm r when the lever-arm u is raised by the retracting-spring z, the resistance to the movement of the armature being diminished by the temporary, entire, or partial demagnetization of the core of the electro-magnet P. An adjusting-screw, a", passes through the arm u of the lever t, and is jointed to a rod, b", which passes through a hole in the arm r, and carries at its lower end an armature, c", which is always held within the influence of the polarized magnet P', which armatures are oppositely polarized. To the upper end of the post Q' is secured a cross-arm, R', having at each end a screw, d", for limiting the motion of the lever t. The spring z is made adjustable by a key, e", passing through the post Q', and arranged to wind a thread, f", attached to the end of the spring.

The receiving or registering mechanism may be made to operate a single index without the employment of gearing to reduce the motion; but I prefer to employ gearing to reduce the motion, so that both feet and inches may be indicated.

The hollow shaft M' carries an index, g", which moves in front of the dial h" and along the inner circle of figures, representing inches. A spindle, i'", extending through the hollow shaft M', carries an index, j'", in front of the dial h", and at the opposite end the spindle carries a spur-wheel, k", which receives motion from a spur-wheel, l", on the end of the hollow shaft M', through the medium of the spur-wheels m" n", connected with each other and turning on the stud o", projecting from the post N". The several spur-wheels are so proportioned that the spindle i" and the index j", carried thereby, revolve once for every twenty-four revolutions of the hollow shaft M', so that while the index g" indicates inches the index j" will indicate feet.

Three binding-posts, 5, 6, and 7, are secured to the base O'. Each of the binding-posts 5 and 7 is connected with the line-wire O and with one terminal of each magnet P' P". The binding-post 6 is connected with the remaining terminals of the magnets. The binding-post 6 is connected with the ground N.

The operation of my improved water-level indicator is as follows: When the water in which the float Q rests rises, the float is raised, and the counter-weight R, drawing on the chain P, turns the wheel D and the shaft C, carrying the disks E G, in the direction indicated by the arrow in Fig. 1. The frictional contact of the arm F with the disk E carries the arm forward, putting the spiral spring g' under compression, thus tending to withdraw the angled end of the lever K from the notch in the post L'. The tension of the spring h, which is constant, pushes the angled end of the lever K against the post L. When the tension of the spring g' becomes sufficient to withdraw the angled end of the lever K' from the notch in the post L', the lower arm of the lever K' strikes the shoulder near the mortise in which it is pivoted, thus tilting the lever K' and the arm of lever J, which supports it, downward, and lever K and the other arm of lever J upward. The pressure of the angled end of the lever K is sufficient to cause it to quickly enter the notch in the post L, being impelled by the tension of the spring h. At the same time the angled end of the lever K', by the tilting of the lever J, is brought into engagement with the spring n', when the current from the battery M flows through the conductor to the post 3, through the wire p, lever K, post L, binding-post 2, to the line in one direction, and through the conductor to the binding-post 4, through the lever K', spring n', post I, wire o, arm H, and, when the contact-springs f are in contact with the arm H, through the springs f, disk E, arm F, wire a, and binding-post 1, to the ground. Under these circumstances, should the water continue to rise, the shaft C will be turned, and the contact-springs $f$, carried by the disk E, will be brought into contact with the arm H one after the other, producing a series of electrical impulses upon the line-wire O, which are all in one direction, and affect only the magnet P″. Each electrical impulse corresponds to the rise of the float through the space of one inch, and each impulse draws down the armature $c″$, belonging to the magnet P″, and, through the medium of the rod $b″$, the lever $t$, and spring-pawl $w$, moves the ratchet-wheel $q′$ forward one tooth for each impulse, thereby indicating by means of the index $g″$ a rise of one inch. Should the level of the water fall, the motion of the shaft C is reversed, the float Q following the water, and, being heavier, then the weight R draws the chain P, so as to continue to move the shaft C so long as the water is falling. The first result of the reversal of the motion of the shaft C is to shift the levers K K′ by moving the arm F forward, so as to compress the spring $g$, thus withdrawing the angled end of the lever K from the notch $l$ in the post L, and bringing it into contact with the spring $n$ at the same instant, carrying the angled end of the lever K′ against the insulating-covering $m$ of the post L′, and finally bringing the end of the arm into the notch $l′$ of the post, thereby reversing the current along the line. Under these circumstances the current will flow from the battery through the binding-post 3, wire $p$, arm K, spring $n$, post I, wire $o$, arm H, contact-points $f$, disk E, arm F, wire $a$, and binding-post 1 to the ground N in one direction, and from the opposite pole of the battery through the conductor to the binding-post 4, through the wire $p′$, lever K′, post L′, and binding-post 2 to the line. The current now sent over the line will not affect the polarized magnet P″ of the receiving-instrument, but will be effective in operating the polarized magnet P′, and, through the medium of the armature $c″$, rod $d″$, lever $t$, spring-pawl $w$, and ratchet-wheel $q$, acting upon the recording mechanism, to diminish the amount indicated by the indexes $j″$ and $g″$.

In this manner the level of the water is always indicated by the indexes in connection with the dial. The helices of the magnets P′ and P″ being of equal resistance, the current from the line is divided at the receiving-instrument into two equal parts, when, by passing around each magnet, this results in the temporary demagnetization of one of the magnets and the augmentation of the power of the other magnet, so that each magnet is rendered effective by the current suited to it. After each downward pull of the magnet on its armature the retractile spring $z$ returns the lever $t$ to its normal position, bringing the end $u$ into contact with the screw $d″$, and bringing the cam $x$ of the pawl $w$ into engagement with the pin $y$, withdrawing the pawl from the path of the teeth of the ratchet-wheel, so that the pawl will not interfere with the rotation of the ratchet-wheel in the opposite direction.

It is obvious that my improved water-level indicator may be applied to other uses with equal advantage. For example, it may be used to indicate the height of a gasometer, or the distance traveled by any moving object either in a horizontal or vertical direction. Therefore I do not confine my invention to the particular use herein described.

Having thus described my invention, what I claim as new, and desire to secure by Letters Patent, is—

1. In an electric water-level indicator, the combination, with a float arranged to be moved by the rise and fall of the water, of a contact-point-carrying disk, an arm depending from the shaft or axis of said disk, and an additional disk and arm, with their electrical connections, substantially as and for the purpose set forth.

2. In an electric water-level indicator, the combination, with a float arranged to be moved by the rise and fall of the water, of a contact-point-carrying disk, and an additional disk and arms carried by the axis or shaft of said disk, two oppositely-arranged sets of mechanism connected with the electro-magnets, and the intermediate mechanism connected with their armatures, substantially as and for the purpose set forth.

3. The combination, in an electrical water-level indicator, of the float Q, chain P, counter-weight R, the wheel D, adapted to the chain P, the shaft C, disk E, and contacts $f$, carried thereby, the disk G, arms F H, and their electrical connections, substantially as herein specified.

4. The combination, in an electrical water-level indicator, of the shaft C, arranged to be operated by the rise and fall of a float, the disk E, mounted on the shaft C, and provided with electrical contact-points $f$, the arm F, carried by the shaft in frictional and electrical contact with the disk E, the levers K K′, springs $g$, $g′$, and $h$, the notched posts L L′, provided with the insulating-covering $m$, the springs $n$ $n′$, the arm H, and their electrical connections, substantially as herein specified.

5. The combination, in an electrical water-level indicator, of the disks E G, contact-points $f$, arm F, provided with arms $b$ $b′$ and screws $c$ $c′$, the arm H, extending between the screws $c$ $c′$, the lever J, having a central insulating part, $j″$, the levers K K′, springs $g$, $g′$, and $h$, the notched posts L L′, having the insulating-covering $m$, the springs $n$ $n′$, and battery M, and the electrical connections, substantially as herein specified.

6. The combination, with the shaft M′ and indexes carried thereby, of two oppositely-arranged ratchet-wheels, $q$ $q′$, two polarized electro-magnets, P′ P″, and two pawls, $w$, operated by the electro-magnets, and arranged to act on the ratchet-wheels $q$ $q′$ of the registering mechanism, substantially as herein specified.

Witnesses:     WILBUR S. MAYERS.
J. C. JORGENSEN,
GUSTAVUS SCHLENCK.